US009264783B2

(12) United States Patent
O'Callaghan

(10) Patent No.: US 9,264,783 B2
(45) Date of Patent: Feb. 16, 2016

(54) DISPLAYING ENCODED VIDEO CONTENT VIA A DISPLAY ADAPTER

(75) Inventor: Daniel J. O'Callaghan, Fairfax Station, VA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 566 days.

(21) Appl. No.: 12/971,553

(22) Filed: Dec. 17, 2010

(65) Prior Publication Data
US 2012/0159531 A1 Jun. 21, 2012

(51) Int. Cl.
H04N 21/658 (2011.01)
H04N 21/414 (2011.01)

(52) U.S. Cl.
CPC ..... H04N 21/6581 (2013.01); H04N 21/41407 (2013.01)

(58) Field of Classification Search
None
See application file for complete search history.

(56) References Cited

U.S. PATENT DOCUMENTS 8,321,564 B2 *   11/2012   Palm et al. ..................... 709/225
8,423,163 B2 *    4/2013   Park ......................... G08C 17/02
                                                          700/17
2005/0010963 A1 *  1/2005   Zeng et al. ..................... 725/131
2008/0075099 A1 *  3/2008   Alao et al. ..................... 370/401
2009/0300679 A1 * 12/2009   Hiroi et al. ...................... 725/40
2010/0037261 A1 *  2/2010   Ohta et al. ....................... 725/40
2010/0095332 A1 *  4/2010   Gran et al. ....................... 725/93
2011/0185045 A1 *  7/2011   Rieger .......................... 709/219
2011/0289537 A1 * 11/2011   Buehl ............................. 725/98
2012/0054794 A1 *  3/2012   Kim et al. ....................... 725/38

OTHER PUBLICATIONS

"IPTV Remote Drives TV Touch Screen Trend", Ericsson, http://www.ericsson.com/news/101019 iptv 244218599 c, Oct. 19, 2010, 2 pages.
The all-new "Remote" release, http://www.apple.com/itunes/remote/, downloaded May 9, 2011.
Yasu, Mariko, "Sony Unveils Tablet PCs, Joins Samsung in Pursuit of IPad," bloomberg.com/news, http://www.bloomberg.com/news/2011-04-26/sony-unveils-tablet-pcs-joins-samsung-motorola-in-pursuit-of-apple-ipad.html, Apr. 26, 2011.
Press Release re: "Sonos System Software 3.4," http://www.sonos.com/news-and-reviews/releases/release/default.aspx?rdr=true&LangType=1033&id=8922, Apr. 19, 2011.

* cited by examiner

Primary Examiner — Jason K Lin

(57) ABSTRACT

A device receives, from a user device, a request to subscribe to a video content service, and receives privileges and a list of authorized users associated with the user device. The device also registers the user device based on the request to subscribe and based on the privileges associated with the user device, and receives a request to register applications associated with the user device. The device further registers, based on the request to register, the applications associated with the user device, and provides, to the user device, at least one registered display adapter that is capable of being used by the user device to display encoded video content.

21 Claims, 16 Drawing Sheets

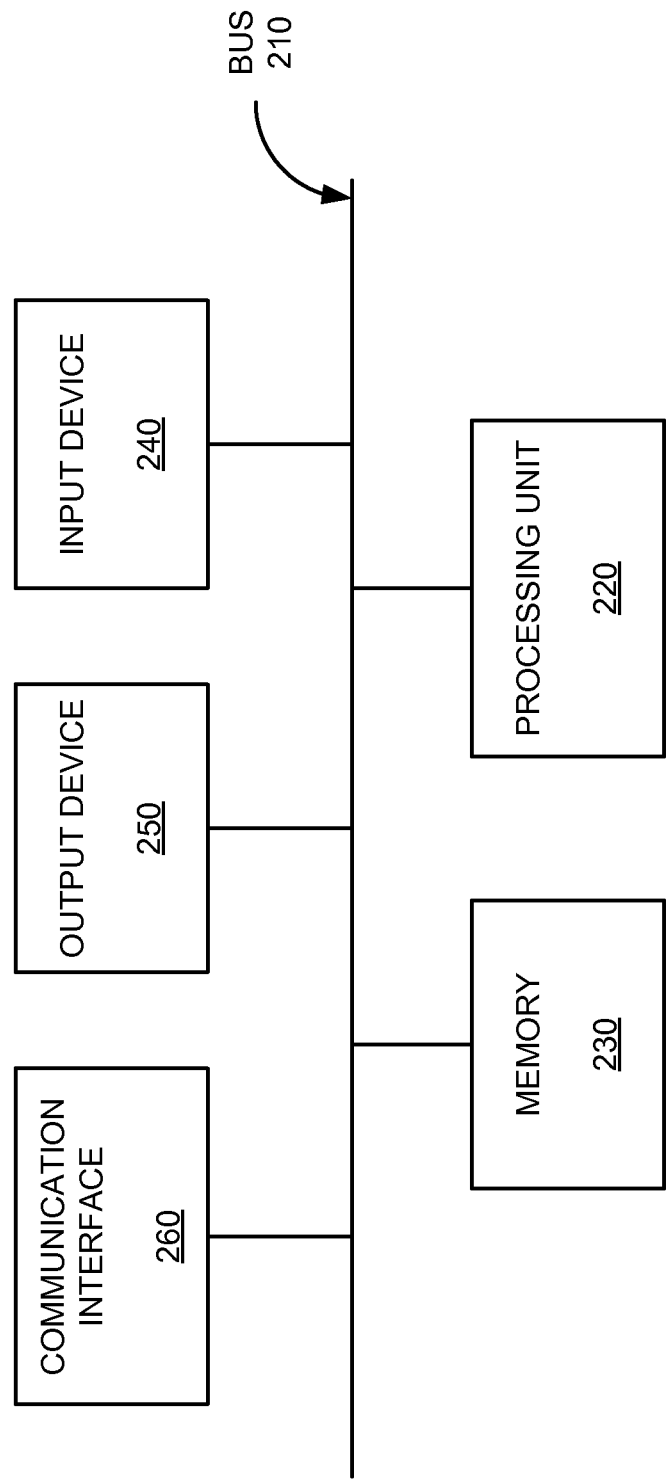

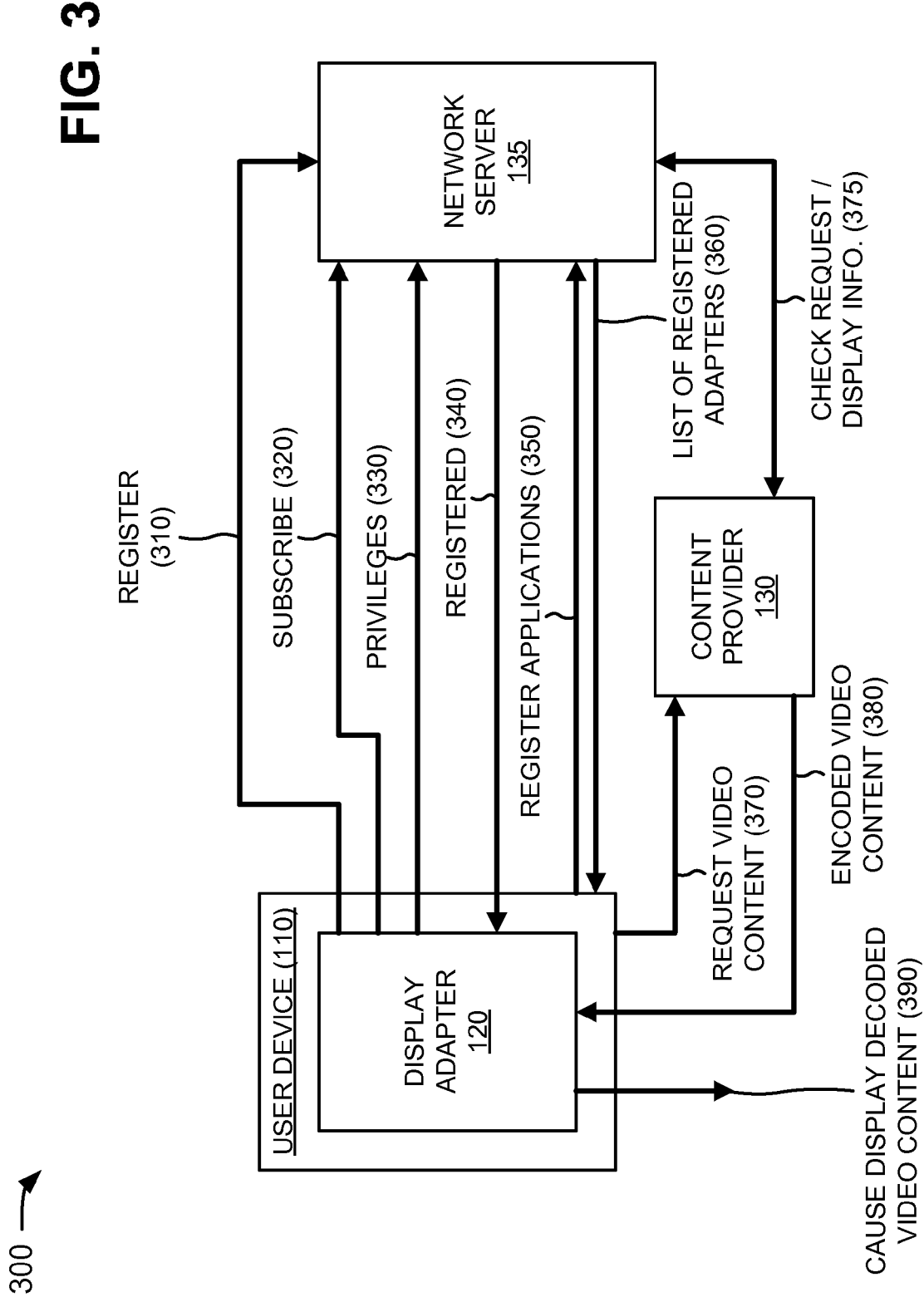

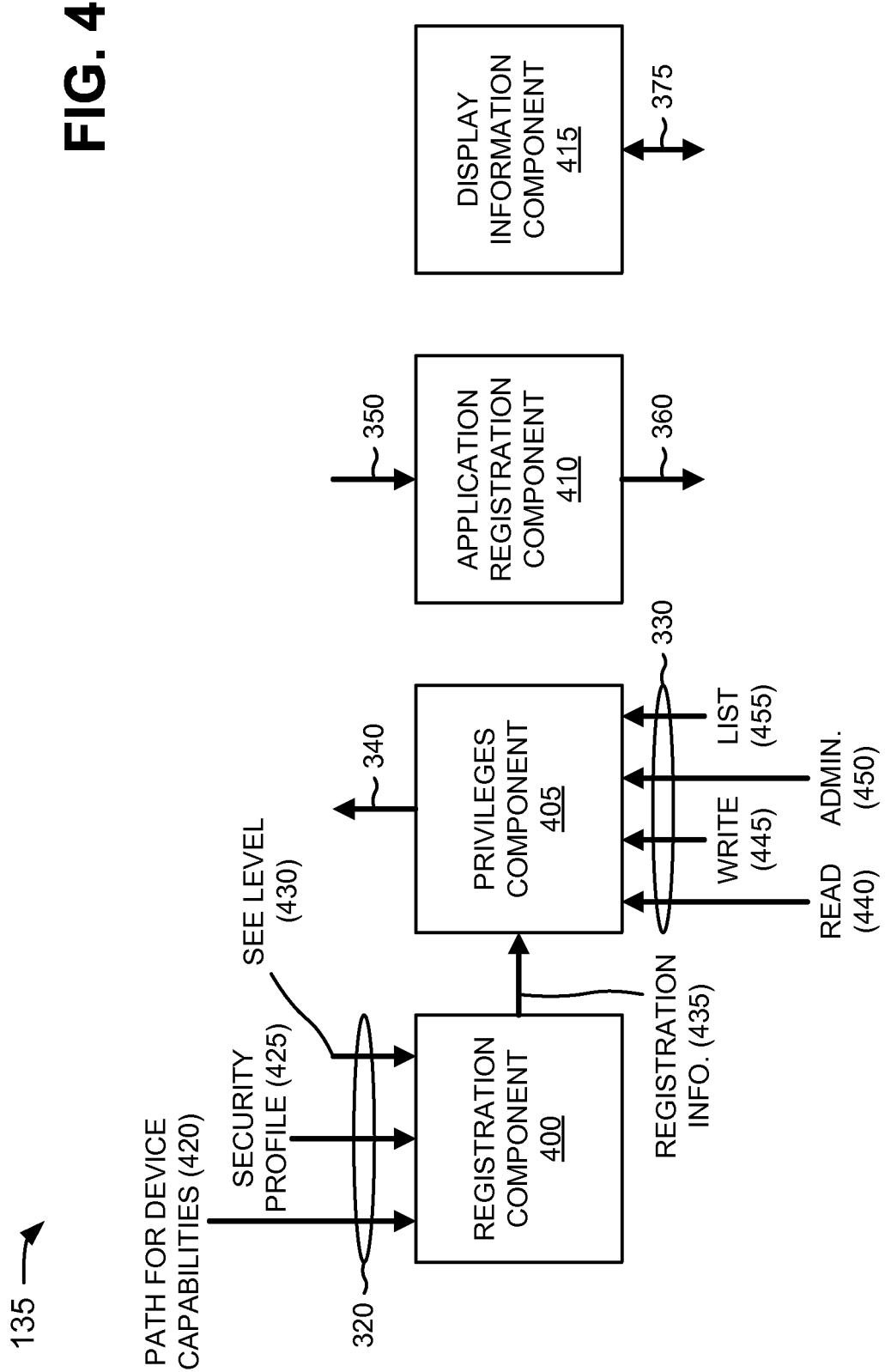

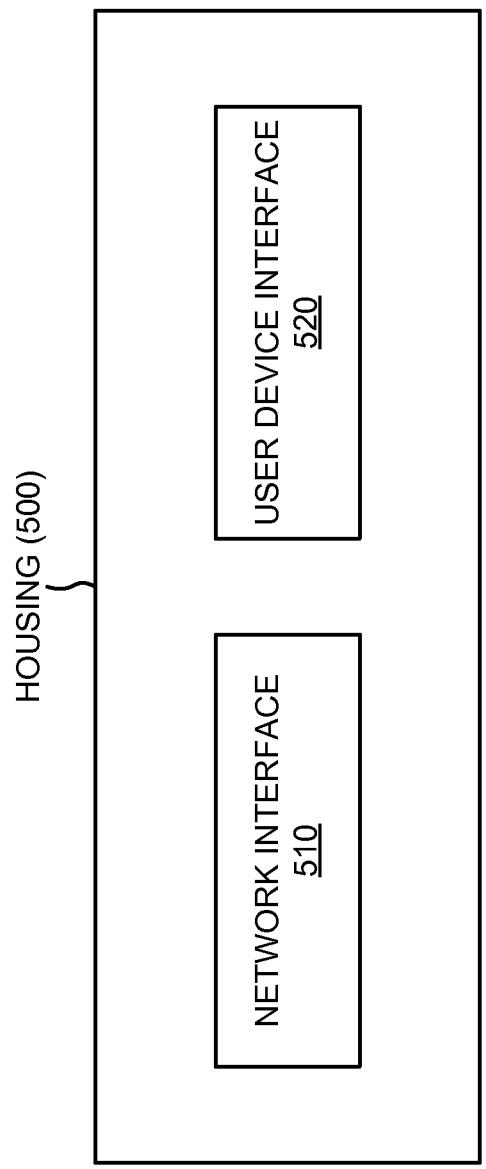

FIG. 5B
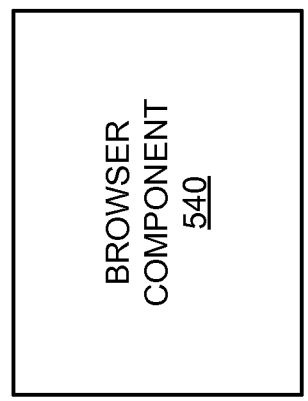
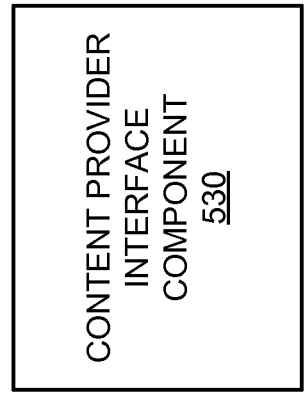

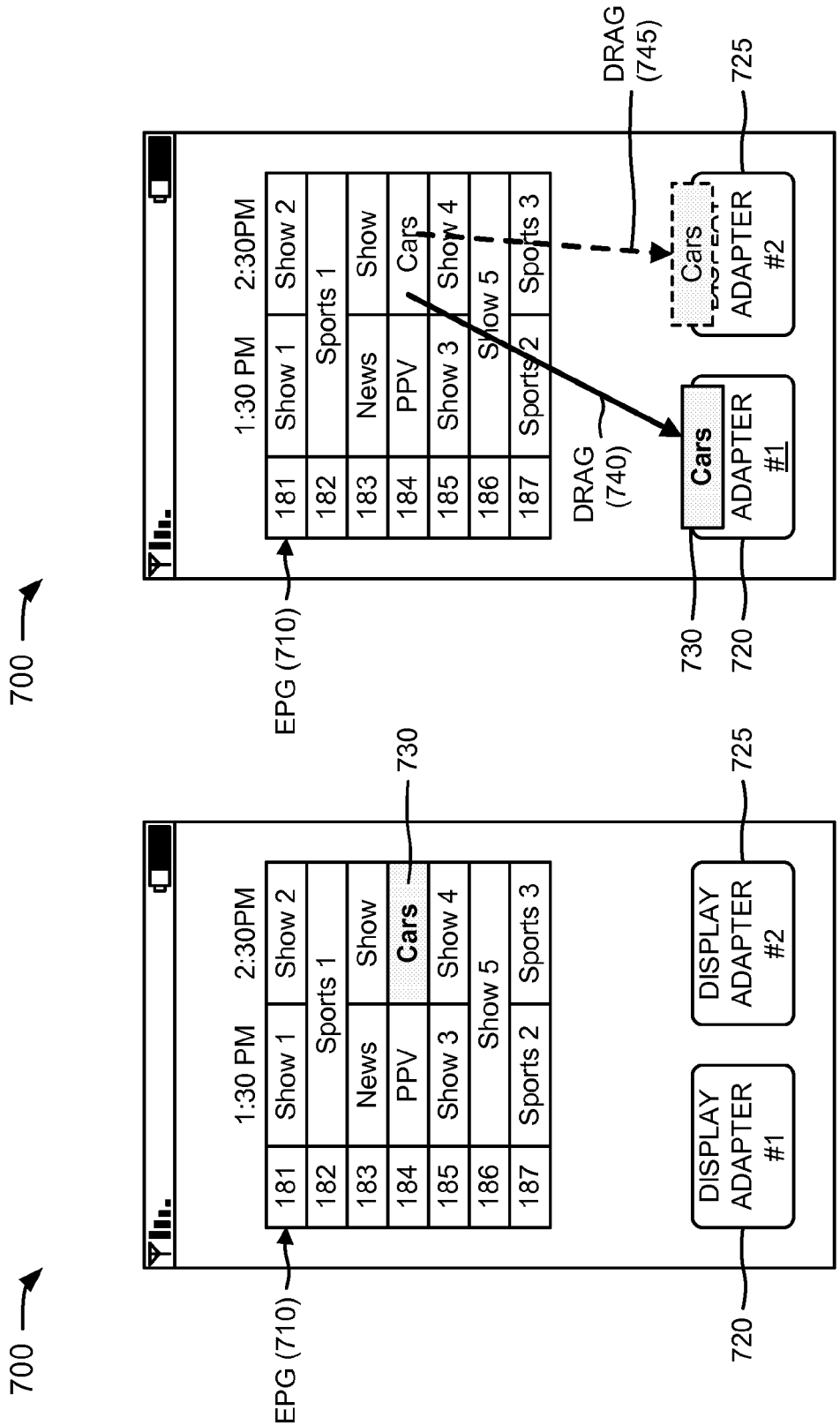

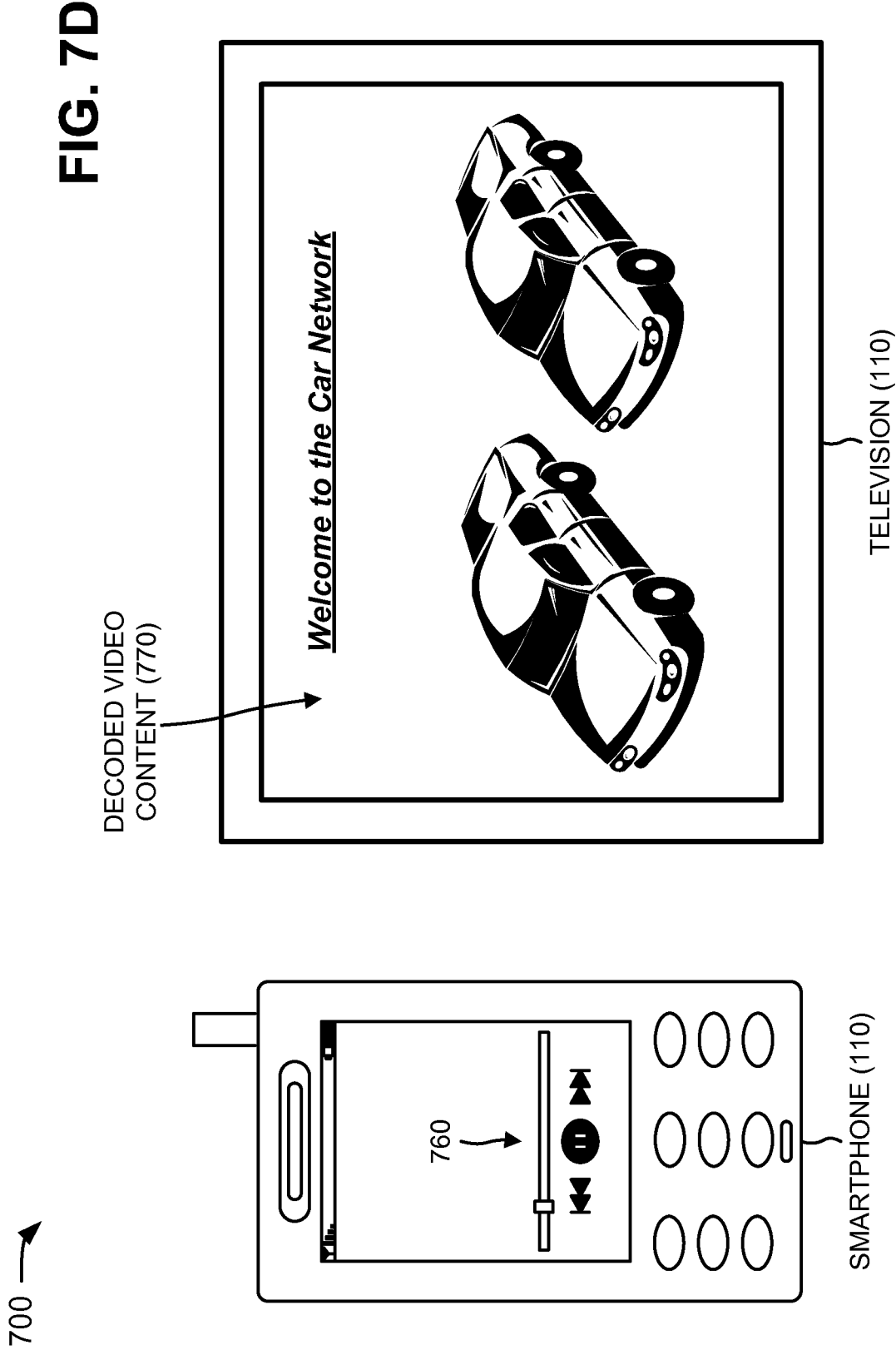

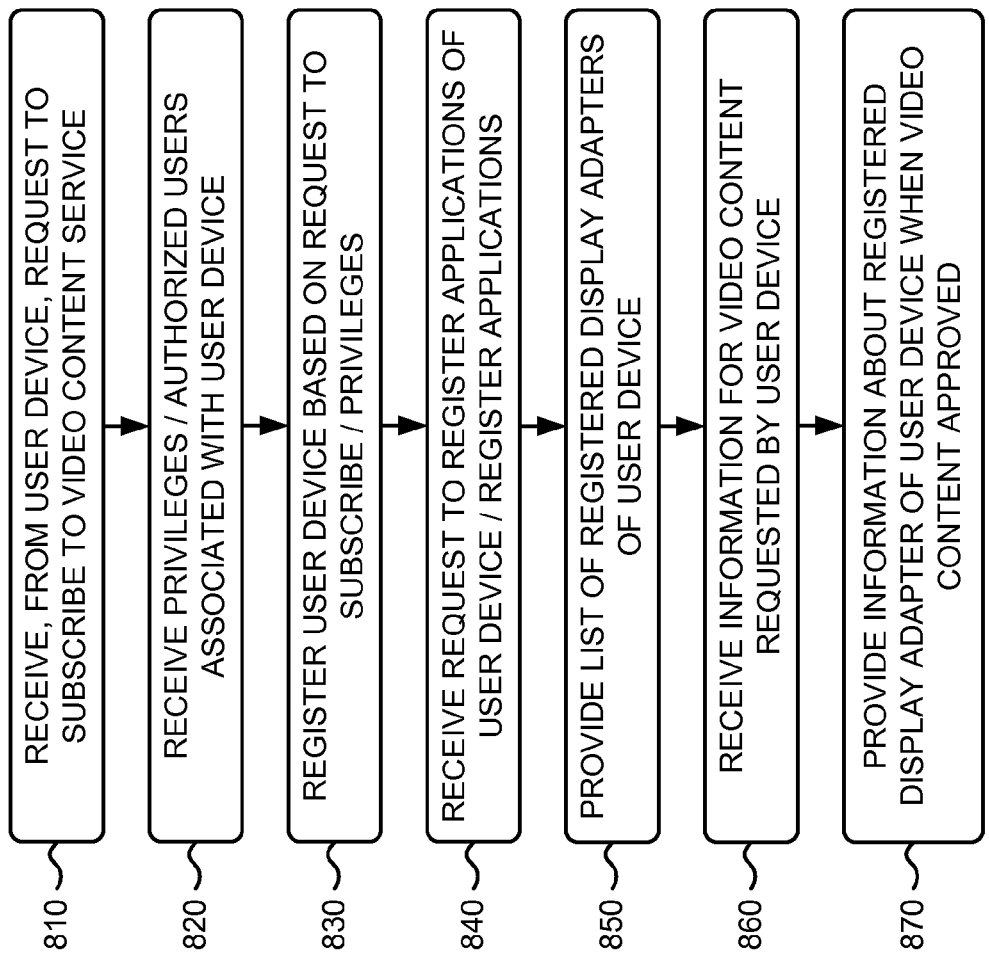

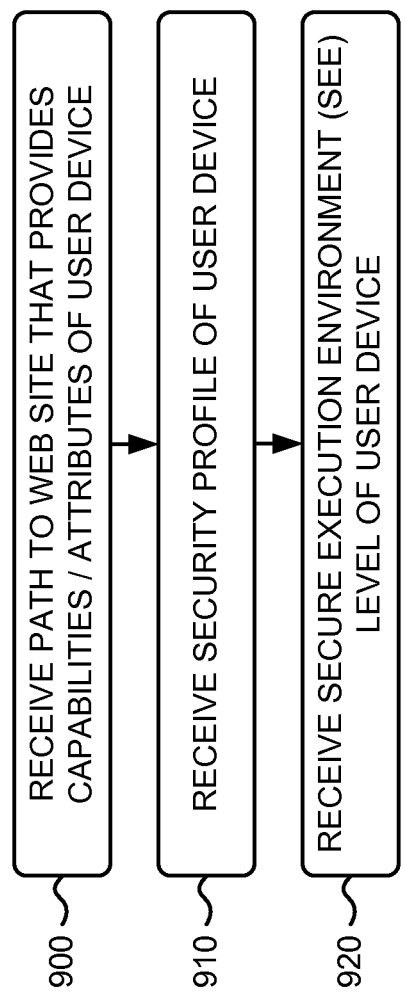

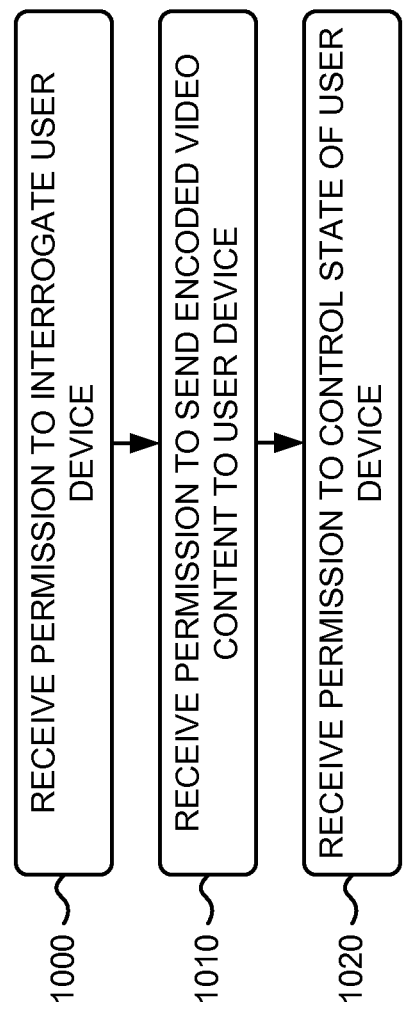

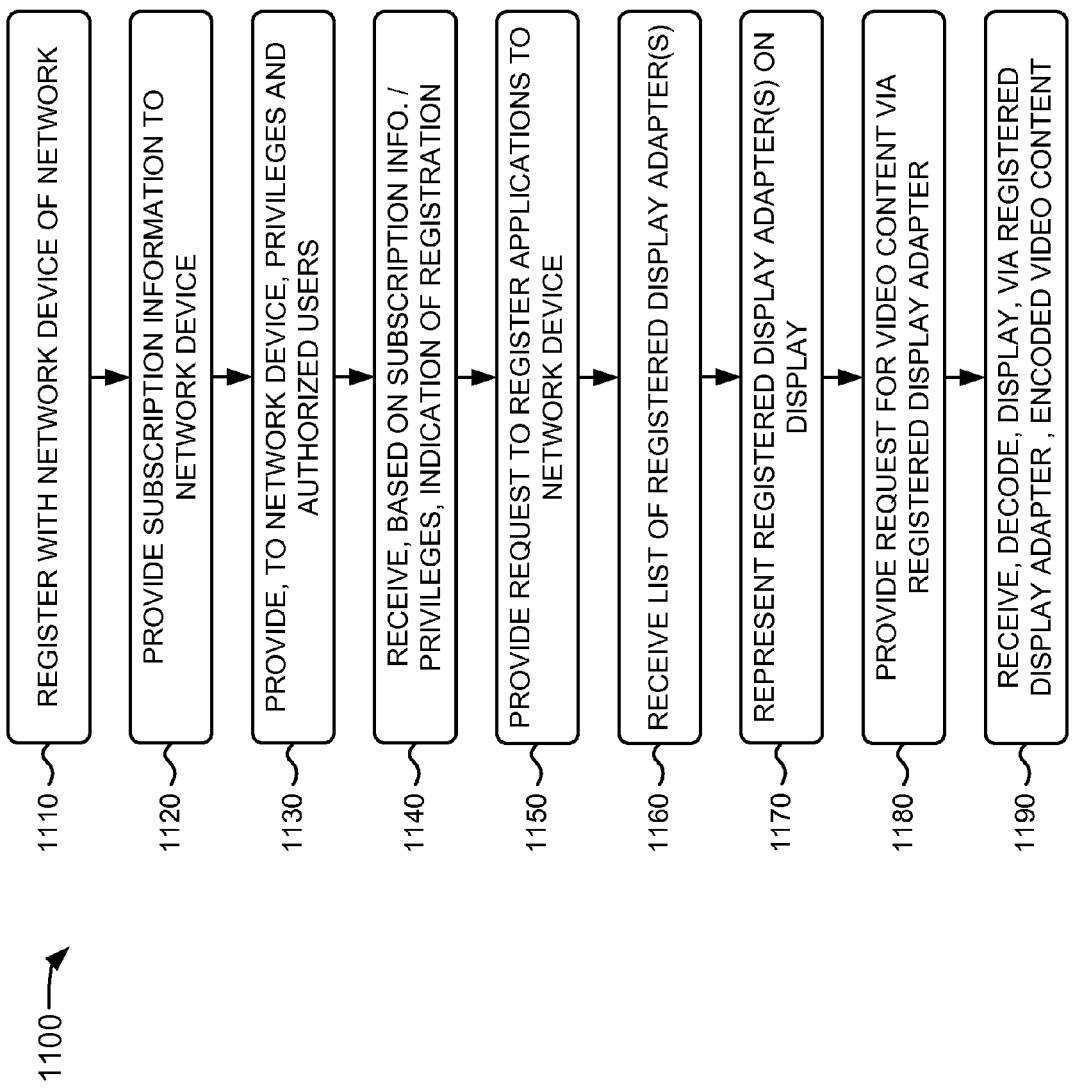

DISPLAYING ENCODED VIDEO CONTENT VIA A DISPLAY ADAPTER

BACKGROUND

A television service provider's set-top box (STB) tightly couples an application environment to an entertainment display (e.g., a television screen). As consumers continue to blur the line between traditional television and other devices that posses audio and video capabilities (e.g., personal computers, smartphones, tablet computers, laptop computers, gaming systems, etc.), such consumers may wish to receive television content on these other devices. However, such other devices are not capable of performing functions (e.g., decoding) on television content that STBs are capable of performing. Furthermore, consumers are increasingly active on the Internet while simultaneously watching television programming. However, attempts to turn a television into an interactive terminal have been unsuccessful.

BRIEF DESCRIPTION OF THE DRAWINGS

FIG. 2 is a diagram of example components of one of the devices depicted in FIG. 1;

FIG. 3 is a diagram of example operations capable of being performed by an example portion of the environment depicted in FIG. 1;

FIG. 4 is a diagram of example functional components of a content provider depicted in FIG. 1;

FIGS. 5A and 5B are diagrams of example components of a display adapter depicted in FIG. 1;

FIGS. 7A-7D are diagrams of example user interfaces capable of being generated by user devices, via the display adapter, depicted in FIG. 1;

FIGS. 8-10 are flow charts of an example process for displaying encoded video content according to implementations described herein; and FIGS. 11-13 are flow charts of another example process for displaying encoded video content according to implementations described herein.

DETAILED DESCRIPTION OF PREFERRED EMBODIMENTS

The following detailed description refers to the accompanying drawings. The same reference numbers in different drawings may identify the same or similar elements.

Systems and/or methods described herein may enable a television service provider to provide encoded video content (e.g., television programming) to any suitable user device (e.g., other than a STB) display and/or may enable the user device to display such video content on displays other than the user device display. For example, the systems and/or methods may enable encoded video content (e.g., television programming previously only available via STBs) to be displayed on personal computers, smartphones, tablet computers, laptop computers, gaming systems, and/or any other user device display. The systems and/or methods may utilize a network (e.g., interconnecting user devices and television service providers) as an interconnected control and bearer plane between application platforms (e.g., provided by the television service providers) and user device displays. The decoupling of the application platform and the display platform (e.g., the STB) may afford customers with a great deal of flexibility in viewing television content, while adding value for the television service provider. For example, a user may utilize a smartphone to request encoded video content to be displayed on a television (e.g., in the user's home), and the television may receive and display the encoded video content. The user may control (e.g., pause, start, stop, fast forward, etc.) the display of the video content on the television via the smartphone.

In one implementation, for example, the systems and/or methods may receive, from a user device, a request to subscribe to a video content service, and may receive privileges and a list of authorized users associated with the user device. The systems and/or methods may register the user device based on the request to subscribe and based on the privileges. The systems and/or methods may receive a request to register applications of the user device, and may provide, based on the request to register, a list of registered display adapters associated with the user device. The systems and/or methods may receive information associated with video content requested by the user device, and may approve or deny the requested video content based on the subscription of the user device, the privileges, the registered display adapters, etc. If the requested video content is approved, the systems and/or methods may provide information about a registered display adapter (e.g., selected by the user device) to a content provider so that the content provider may provide the video content to the user device (e.g., via the registered display adapter).

As used herein, the terms "user" and "customer" are intended to be broadly interpreted to include a user device or a user of a user device.

Figure 1:
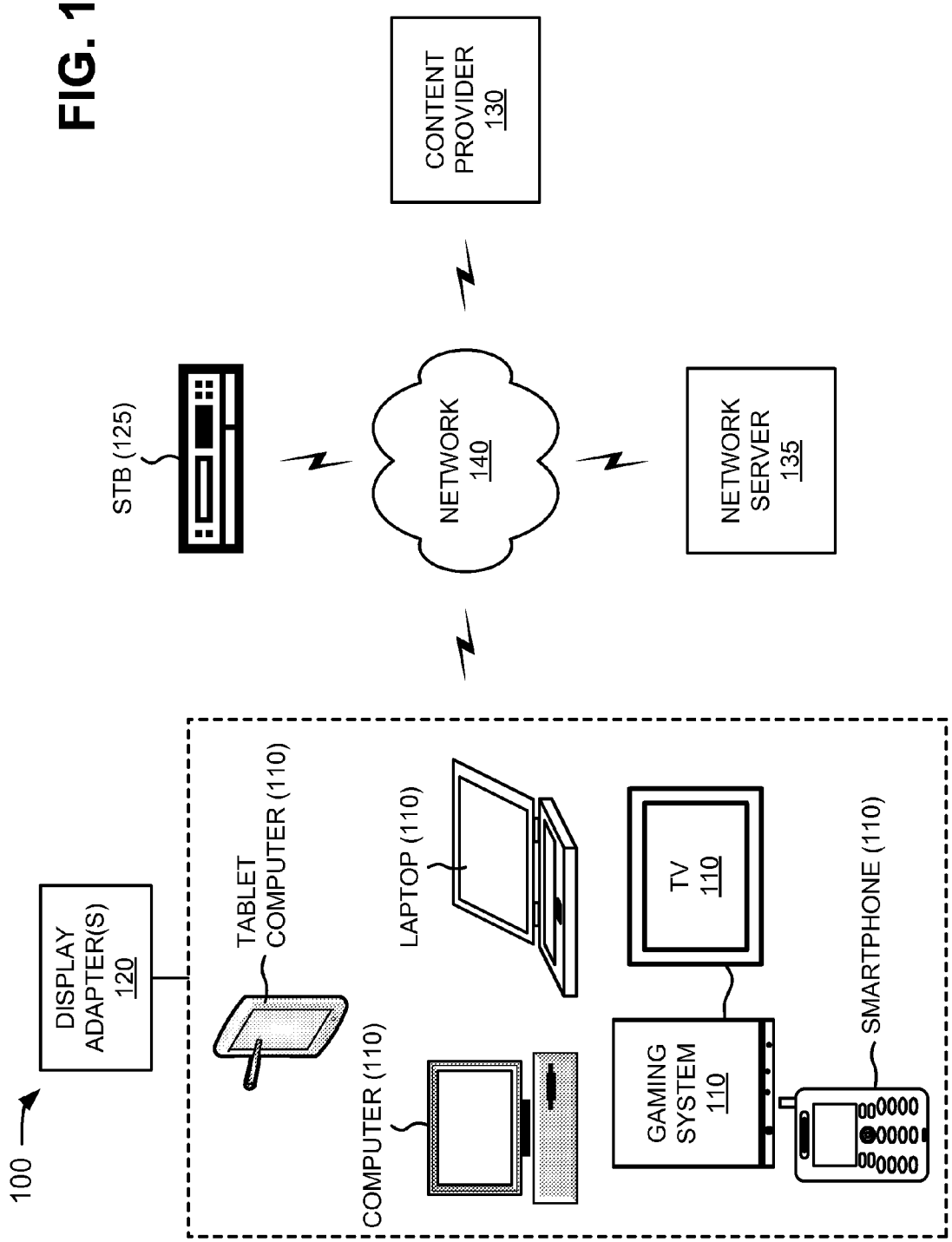
FIG. 1 is a diagram of an example environment in which systems and/or methods described herein may be implemented.

FIG. 1 is a diagram of an example environment 100 in which systems and/or methods described herein may be implemented. As illustrated, environment 100 may include a number of user devices 110 (e.g., a smartphone, a gaming system and television, a personal computer, a laptop computer, a tablet computer, etc), a number of display adapters 120 (e.g., provided within or associated with user devices 110), a STB 125, a content provider 130, and a network server 135 interconnected by a network 140. Components of environment 100 may interconnect via wired and/or wireless connections. Six user devices 110, one display adapter 120, one STB 125, one content provider 130, one network server 135, and one network 140 have been illustrated in FIG. 1 for simplicity. In practice, there may be more user devices 110, display adapters 120, STBs 125, content providers 130, network servers 135, and/or networks 140.

Each of user devices 110 may include any device that is capable of communicating with content provider 130, via network 140, and is capable of playing audio and video content (e.g., television programming). For example, user device 110 may include a mobile computation and/or communication device, such as a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a wireless device, a smartphone, a laptop computer (e.g., with a wireless air card), a global positioning system (GPS) device, a content recording device (e.g., a camera, a video camera, etc.), etc. In another example, user device 110 may include a fixed (e.g., provided in a particular location, such as within a user's home) computation and/or communication device, such as a laptop computer, a personal computer, a tablet computer, a television, a gaming system, etc.

Display adapter 120 may include a component of user device 110, an application executed by user device 110 (e.g., via an operating system of user device 110), or a separate device connected to user device 110. In one example implementation, user device 110 (e.g., via display adapter 120) may register with network 140 and may identify itself as being capable of receiving transferred sessions (e.g., encoded video content). User device 110 (e.g., via display adapter 120) may initiate a session with network 140 so that network 140 may register the presence of display adapter 120 on network 140 and may determine capabilities, a content security profile, and user privileges associated with user device 110 and/or display adapter 120. This may establish a directory service in network 140 of user devices 110 and/or display adapters 120 that can receive encoded video content (e.g., rich media content) for display.

In one example implementation, user device 110 (e.g., via display adapter 120) may register with a network (e.g., network 140 via network server 135) associated with content provider 130, and may provide subscription information to network server 135. User device 110 may provide, to network server 135, privileges and authorized users associated with user device 110 (e.g., and display adapter 120), and may receive, based on the subscription information and the privileges, an indication of being registered with network server 135 and/or network 140. User device 110 may provide, to network server 135, a request to register applications associated with user device 110, and may receive, based on the register request, a list of registered display adapters (e.g., display adapter 120). User device 110 may represent (e.g., via an icon) one or more of the registered display adapters (e.g., display adapter 120) on a display of user device 110, and may provide, to content provider 130, a request for video content via the registered display adapter. User device 110 (e.g., via display adapter 120) may receive encoded video content from content provider 130 (e.g., after network server 135 approves the video content delivery), may decode the encoded video content, and may display the video content on the display. Further details of user device 110 and display adapter 120 are provided below in connection with, for example, FIGS. 3 and 5A-7D.

STB 125 may include a device that receives television programming (e.g., from content provider 130), decodes (or decompresses) the television programming, and provides the decoded television programming to a television or another display device. STB 125 may allow a user to alter the television programming provided to the television based on a signal (e.g., a channel up or channel down signal) received from a remote control. STB 125 may record video in a digital format to a disk drive or other memory medium within STB 125. In one example implementation, STB 125 may be incorporated directly within a television and/or may include a digital video recorder (DVR). In another example, STB 125 may correspond to one of user devices 110.

Content provider 130 may include one or more server devices, or other types of computation or communication devices, that gather, process, search, and/or provide information in a manner described herein. In one implementation, content provider 130 may include a computer system, an application, a cable head-end, and/or a broadcasting device capable of providing content (e.g., video on demand (VOD) content, high definition (HD)-VOD content, television programming, movies, on-demand services, live television, etc.), commercials, advertisements, instructions, and/or other information to user devices 110 (e.g., via display adapter 120) and/or to STB 125. Further details of content provider 130 are provided below in connection with, for example, FIGS. 2 and 3.

Network server 135 may include one or more server devices, or other types of computation or communication devices, that gather, process, search, and/or provide information in a manner described herein. In one implementation, network server 135 may provide information about a target display adapter 120 (e.g., a type of display adapter 120, a security profile of display adapter 120, capabilities of display adapter 120, etc.). In one example, when network server 135 knows that display adapter 120 is already in use, network server 135 may notify content provider 130 and user device 110 that the requested display adapter 120 is busy. In turn, user device 110 may make an inquiry to network server 135 regarding why display adapter 120 is busy. In one example, network server 135 may be provided within network 140 and may enable network 140 to police the distribution of video content from content provider 130 to user devices 110 (e.g., via display adapter 120). Further details of network server 135 are provided below in connection with, for example, FIGS. 2-4.

Network 140 may include a local area network (LAN), a wide area network (WAN), a metropolitan area network (MAN), a telephone network, such as the Public Switched Telephone Network (PSTN), an intranet, the Internet, an optical fiber (or fiber optic)-based network, a cable television network, a satellite television network, or a combination of networks. In one example implementation, network 140 may include a next generation network (NGN), such as a managed Internet protocol (IP) network that utilizes IP Multimedia Subsystem (IMS) architecture for management functions. In an IMS environment, devices (e.g., user devices 110 and/or display adapter 120) may register with the IMS core so the devices' presence on network 140 is known. Registered devices may then access services on network 140 (e.g., services provided by content provider 130) or may be reached by other devices on network 140.

Although FIG. 1 shows example components of environment 100, in other implementations, environment 100 may contain fewer components, different components, differently arranged components, or additional components than depicted in FIG. 1. In still other implementations, one or more components of environment 100 may perform one or more other tasks described as being performed by one or more other components of environment 100.

FIG. 2 is a diagram of example components of a device 200 that may correspond to one of the devices of environment 100. As illustrated, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 260 may include mechanisms for communicating with other devices, such as other devices of environment 100.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may contain fewer components, different components, differently arranged components, or additional components than depicted in FIG. 2. In still other implementations, one or more components of device 200 may perform one or more other tasks described as being performed by one or more other components of device 200.

FIG. 3 is a diagram of example operations capable of being performed by an example portion 300 of environment 100. As shown, example portion 300 may include user device 110, display adapter 120, content provider 130, and network server 135. User device 110, display adapter 120, content provider 130, and network server 135 may include the features described above in connection with one or more of FIGS. 1 and 2. In one example implementation, display adapter 120 may be a component provided within user device 110 or an application executed by user device 110. In another example implementation, display adapter 120 may be a separate device from user device 110 (e.g., but may communicate with user device 110).

As further shown in FIG. 3, user device 110 and/or display adapter 120 may register with network server 135 (e.g., network 140), as indicated by reference number 310. After registering with network server 135, user device 110/display adapter 120 may subscribe to (or register with) a video content service provided by network server 135, as indicated by reference number 320. In one example, user device 110/display adapter 120 may register a user (e.g., associated with user device 110/display adapter 120) with the video content service. As part of the registration process with network server 135, user device 110/display adapter 120 may provide device credentials (e.g., an Alliance for Telecommunications Industry Solutions (ATIS) IIF compliant device certificate) to network server 135 and/or network 140. In one example, the credentials of user device 110/display adapter 120 may include a path (e.g., a uniform resource locator (URL)) to a web site where network server 135 may download capabilities and attributes (e.g., via an extended markup language (XML) file) associated with user device 110/display adapter 120. The credentials of user device 110/display adapter 120 may also include a content security profile of user device 110/display adapter 120 (e.g., as verified by an independent test laboratory); a secure execution environment (SEE) level to which user device 110/display adapter 120 has been tested (e.g., as verified by an independent test laboratory); an identifier (ID) associated with user device 110/display adapter 120; a network address associated with user device 110/display adapter 120.

Part of the registration process with network server 135 may also include user device 110/display adapter 120 advertising (or providing) a list of authorized users (e.g., of user device 110/display adapter 120) and privileges associated with a user of user device 110/display adapter 120 to network server 135, as indicated by reference number 330. In one example, the privileges may include a read privilege (e.g., which may permit network server 135 to interrogate a state of user device 110/display adapter 120); a write privilege (e.g., which may permit network server 135 to approve content provider 130 for sending encoded video content to user device 110/display adapter 120); and/or an administer privilege (e.g., which may permit network server 135 to control a state of user device 110/display adapter 120). The privileges may control what users can use user device 110/display adapter 120, what devices can interrogate user device 110/display adapter 120, and what devices have priority control over use of display adapter 120. This may ensure that other users cannot direct content to user device 110/display adapter 120 without the permission of the user of user device 110/display adapter 120, and may enable parents to assert parental controls over user device 110/display adapter 120 (e.g., provided in a home). For example, a parent, via user device 110, may associate display adapters 120 with other user devices 110 (e.g., a television, a computer, a gaming system, etc.) provided in the home. The parent, via user device 110, may assert parental controls over the other user devices 110, and may check to see if display adapters 120 associated with other user devices 110 are being utilized. This may enable the parent to check whether a child is at home doing homework or, instead, is watching television, surfing the Internet, or playing video games.

Network server 135 may determine whether to register user device 110/display adapter 120 (e.g., for the video content service) based on the provided credentials, the list of authorized users, and/or the provided privileges. In one example, if network server 135 registers user device 110/display adapter 120, network server 135 may provide, to user device 110/display adapter 120, an indication 340 that registration is complete.

As further shown in FIG. 3, user device 110 may provide a request to register applications (e.g., video applications, Internet browser applications, audio applications, etc.) of user device 110 to network server 135, as indicated by reference number 350. Network server 135 may receive request 350 and may register the applications of user device 110. User device 110 may retrieve (e.g., from network server 135) a list 360 of registered display adapters of which the user of user device 110 is a valid user. For example, list 360 of registered display adapters may include display adapter 120. User device 110 may provide a representation (e.g., an icon, a button, or another selection mechanism) of each accessible display adapter (e.g., provided in list 360) on a display of user device 110. In one example, user device 110 may provide an icon (e.g., representing display adapter 120) on its display. In another example, a user of user device 110 may select one or more of the registered display adapters provided in list 360, and user device 110 may provide representations of only the selected registered display adapter(s).

User device 110 (e.g., via display adapter 120) may provide a request 370 for video content to content provider 130. For example, if a video application (e.g., an electronic program guide (EPG)) and the representation of display adapter 120 are displayed by user device 110, a user may select an item (e.g., a television show) from the EPG and may drag (i.e., move) and drop the item on the representation of display adapter 120. The drag and drop action may cause user device 110 (e.g., via display adapter 120) to generate request 370. Content provider 130 may receive request 370, and may check request 370 with network server 135, as indicated by reference number 375. As part of the check, content provider 130 may determine whether user device 110 is approved to utilize display adaptor 120; whether display adaptor 120 is permitted to display the requested video content; whether the requested content is suitable for the viewer of the content; etc. For example, if a user, via user device 110, requests video content to be provided to a DVR, content provider 130 may deny such a request (e.g., based on check 375) since the DVR may be used to inappropriately record the video content. However, if the same user requests the same video content to be provided to a television, content provider 130 may approve such a request.

If content provider 130 approves request 370, content provider 130 may request display information from network server 135, and network server 135 may provide display information to content provider 130, as further indicated by reference number 375. The display information may include information regarding the size of the display, the capabilities of the display (e.g., resolution capabilities, such as 1080i, 1080p, high definition, etc.), etc. associated with the selected display adapter 120. Based on the display information, content provider 130 may provide encoded video content 380 (e.g., requested by request 370) to display adapter 120. Encoded video content 380 may include an audio and/or video signal (e.g., and any associated metadata) that is encoded (or compressed) in accordance with a standard, such as a MPEG transport stream standard or any standard that may typically be decoded. Display adapter 120 may receive encoded video content 380, may decode encoded video content 380, and may cause display (e.g., may provide audio, video, associated metadata, etc.) of the decoded video content, as indicated by reference number 390. For example, if user device 110 requested that encoded video content 380 be provided via a television (e.g., separate from user device 110), display adapter 120 may decode encoded video content 380, and may cause the decoded video content to be provided to the television. The television may receive the decoded video content, and may display (e.g., may provide audio, video, associate metadata, etc.) of the decoded video content.

In one example implementation, display adapter 120 may check the requirements associated with the requested video content against the capabilities of display adapter 120, and, if display adapter 120 is capable of handling the requested video content, may receive a media source URL (e.g., providing a location of the requested video content) and access security data associated with the requested video content. Display adapter 120 may initiate a session with the media source URL, may perform any needed security checks, and may initiate a transfer of the requested video content directly to display adapter 120. The requested video content may be streamed directly from the media source URL to display adapter 120. While display adapter 120 is displaying the requested video content, user device 110 may initiate an application that maintains a session with the media source URL for the purpose of enabling a user to control (e.g., pause, stop, play, fast forward, rewind, etc.) the requested video content. Since user device 110, rather than display adapter 120, may provide control over the requested video content, display adapter 120 may be a simple and low cost component, device, and/or application.

Although FIG. 3 shows example components of portion 300, in other implementations, portion 300 may contain fewer components, different components, differently arranged components, or additional components than depicted in FIG. 3. Alternatively, or additionally, one or more components of portion 300 may perform one or more other tasks described as being performed by one or more other components of portion 300.

FIG. 4 is a diagram of example functional components of network server 135. In one implementation, the functions described in connection with FIG. 4 may be performed by one or more components of device 200 (FIG. 2). As illustrated in FIG. 4, network server 135 may include a registration component 400, a privileges component 405, an application registration component 410, and a display information component 415.

Registration component 400 may include hardware or a combination of hardware and software that may receive request 320 to subscribe to a video content service provided by content provider 130. In one example, request 320 may include credentials 420-430 associated with user device 110/display adapter 120. Credentials 420-430 may include a path 420 (e.g., a URL) to a web site where network server 135 may download capabilities and attributes (e.g., via an XML file) associated with user device 110/display adapter 120. Web sites that may provide such information may include web sites associated with the ATIS, the BroadBand Forum, and Universal Plug and Play (UPnP). Credentials 420-430 may also include a content security profile 425 of user device 110/display adapter 120 (e.g., as verified by an independent test laboratory), and a SEE level 430 to which user device 110/display adapter 120 has been tested (e.g., as verified by an independent test laboratory). The ATIS IIF has designed a framework for classifying devices according to content security profiles and SEE levels. The content security profiles and SEE levels may be contained in a secure certificate that may be provided to network server 135 (e.g., registration component 400) when user device 110/display adapter 120 register with network server 135. As further shown in FIG. 4, registration component 400 may utilize the credentials contained in request 320 (e.g., path 420, security profile 425, and SEE level 430) to generate registration information 435 for user device 110/display adapter 120. Registration component 400 may provide registration information 435 to privileges component 405.

Privileges component 405 may include hardware or a combination of hardware and software that may receive registration information 435 from registration component 400, and may receive information 330 from user device 110/display adapter 120. Information 330 may include privileges 440-450 associated with a user of user device 110/display adapter 120 and a list 455 of authorized users of user device 110/display adapter 120. Privileges 440-450 may include a read privilege 440 (e.g., which may permit network server 135 to interrogate a state of user device 110/display adapter 120); a write privilege 445 (e.g., which may permit network server 135 to approve content provider 130 for sending encoded video content to user device 110/display adapter 120); and/or an administer privilege 450 (e.g., which may permit network server 135 to control a state of user device 110/display adapter 120).

Privileges 440-450 and/or list 455 may control what users can use user device 110/display adapter 120, what devices can interrogate user device 110/display adapter 120, and what devices have priority control over use of display adapter 120. Privileges component 405 may determine whether to register user device 110/display adapter 120 (e.g., for the video content service) based on credentials 420-430, privileges 440-450, and/or list 455 of authorized users. In one example, if privileges component 405 registers user device 110/display adapter 120, privileges component 405 may provide, to user device 110/display adapter 120, indication 340 that registration is complete.

Application registration component 410 may include hardware or a combination of hardware and software that may receive request 350 to register applications (e.g., video applications, Internet browser applications, audio applications, etc.) of user device 110. Application registration component 410 may register the applications (e.g., provided in request 350) of user device 110, and may provide list 360 of registered display adapters of which the user of user device 110 is a valid user. In one example, list 360 of registered display adapters may include display adapter 120.

Display information component 415 may include hardware or a combination of hardware and software that may enable content provider to check request 370 with network server 135, as indicated by reference number 375. As part of the check, content provider 130 may determine whether user device 110 is approved to utilize display adaptor 120; whether display adaptor 120 is permitted to display the requested video content; whether the requested content is suitable for the viewer of the content; etc. If content provider 130 approves request 370, content provider 130 may request display information from network server 135, and display information component 415 may provide display information to content provider 130, as further indicated by reference number 375. The display information may include information regarding the size of the display, the capabilities of the display (e.g., resolution capabilities, such as 1080i, 1080p, high definition, etc.), etc. associated with the selected display adapter 120.

Based on the display information, content provider 130 may retrieve encoded video content 380 (e.g., requested by request 370) in an appropriate format, and may provide encoded video content 380 to display adapter 120. In one example implementation, encoded video content 380 may include a media source or content URL (e.g., providing a location of the requested video content) and access security data associated with the requested video content. If display adapter 120 initiates a session with the content URL and performs any needed security checks (e.g., associated with the access security data), content provider 130 may stream the requested video content directly from the content URL to display adapter 120. While display adapter 120 is displaying the requested video content, user device 110 may initiate an application that maintains a session with the content URL for the purpose of enabling a user to control (e.g., pause, stop, play, fast forward, rewind, etc.) the requested video content.

Although FIG. 4 shows example functional components of network server 135, in other implementations, network server 135 may include fewer functional components, different functional components, differently arranged functional components, or additional functional components than depicted in FIG. 4. Alternatively, or additionally, one or more functional components of network server 135 may perform one or more other tasks described as being performed by one or more other functional components of network server 135.

FIGS. 5A and 5B are diagrams of example components of display adapter 120. In one example implementation, display adapter 120 may include the components depicted in FIGS. 5A and 5B when display adapter 120 is a separate device from user device 110. FIG. 5A may depict external components of display adapter 120 and FIG. 5B may depict internal functional components of display adapter 120. In one implementation, the functions described in connection with FIG. 5B may be performed by one or more components of device 200 (FIG. 2).

As shown in FIG. 5A, display adapter 120 may include a housing 500, a network interface 510, and a user device interface 520. Housing 500 may protect the components of display adapter 120 from outside elements. In one example, housing 500 may be sized and shaped to accommodate the components of display adapter 120 and may provide structural support for network interface 510 and user device interface 520. Housing 500 may be made from a variety of materials, such as plastics (e.g., thermoplastics), metals (e.g., aluminum, steel, etc.), etc.

Network interface 510 may be a point of attachment for physical links, may be a point of entry for incoming traffic (e.g., video content) received from content provider 130, network server 135, and/or network 140, and may be a point of exit for outgoing traffic (e.g., requests for video content) provided to content provider 130, network server 135, and/or network 140. In one example implementation, network interface 510 may include an Ethernet interface for accessing network server 135 and/or network 140.

User device interface 520 may be a point of attachment for physical links, may be a point of entry for incoming traffic (e.g., requests for video content) received from user device 110, and may be a point of exit for outgoing traffic (e.g., video content) provided to user device 110. In one example implementation, user device interface 520 may include a High-Definition Multimedia Interface (HDMI) for connecting to user device 110.

As shown in FIG. 5B, display adapter 120 may include a content provider interface component 530 and a browser component 540. Content provider interface component 530 may include hardware or a combination of hardware and software that may enable display adapter 120 to interface (or communicate) with content provider 130, network server 135, and/or network 140 (e.g., via network interface 510). For example, content provider interface component 530 may execute protocols that enable display adapter 120 to communicate with content provider 130, network server 135, and/or network 140.

Browser component 540 may include hardware or a combination of hardware and software that may enable display adapter 120 to interface (or communicate) with a media source URL (e.g., the content URL described above in FIG. 4). In one example implementation, browser component 540 may include a version of HyperText Markup Language (HTML), such as HTML-5, so that graphics and media decoding may be supported by display adapter 120. HTML-5 may permit integration of a variety of decoders for processing a media stream. If a HTML-5 session provided by browser component 540 expects to receive input from a user (e.g., of user device 110), browser component 540 may be designed to accept the user input via an application (e.g., a video player) provided by user device 110.

Although FIGS. 5A and 5B show example components of display adapter 120, in other implementations, display adapter 120 may contain fewer components, different components, differently arranged components, or additional components than depicted in FIGS. 5A and 5B. Alternatively, or additionally, one or more components of display adapter 120 may perform one or more other tasks described as being performed by one or more other components of display adapter 120.

Figure 6:
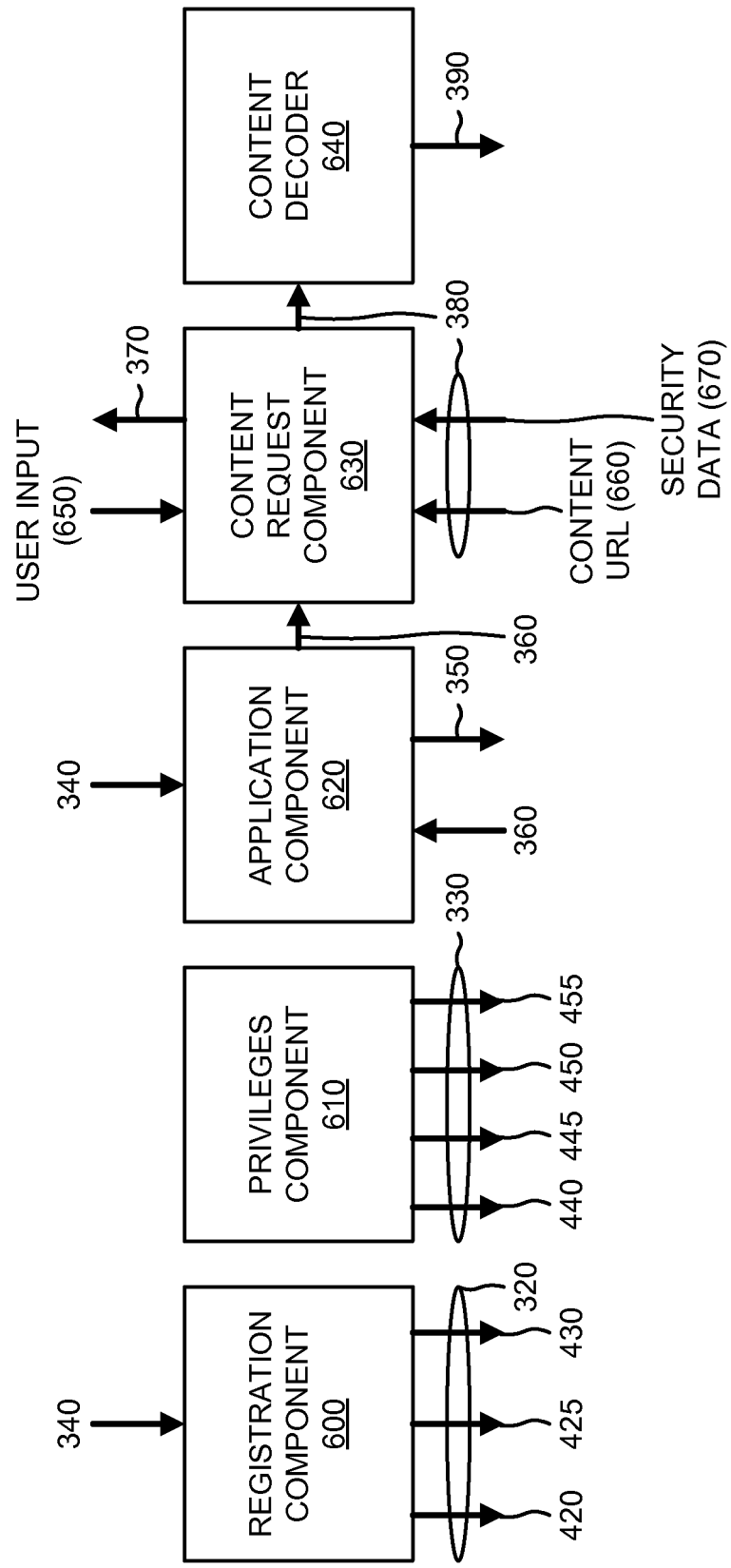
FIG. 6 is a diagram of example functional components of the display adapter of FIG. 1.

FIG. 6 is a diagram of example functional components (in addition to the functional components described above in FIG. 5B) of display adapter 120. In one implementation, the functions described in connection with FIG. 6 may be performed by one or more components of device 200 (FIG. 2). In another implementation, the functions described in connection with FIG. 6 may be performed by user device 110 (e.g., with display adapter 120). As illustrated in FIG. 6, display adapter 120 may include a registration component 600, a privileges component 610, an application component 620, a content request component 630, and a content decoder 640.

Registration component 600 may include hardware or a combination of hardware and software that may generate request 320 to subscribe to a video content service provided by content provider 130. In one example, request 320 may include path 420 (e.g., a URL) to a web site where network server 135 may download capabilities and attributes (e.g., via an XML file) associated with user device 110/display adapter 120; content security profile 425 of user device 110/display adapter 120 (e.g., as verified by an independent test laboratory); and SEE level 430 to which user device 110/display adapter 120 has been tested (e.g., as verified by an independent test laboratory). Registration component 600 may provide request 320 to network server 135.

Privileges component 610 may include hardware or a combination of hardware and software that may provide information 330 to network server 135. Information 330 may include read privilege 440, write privilege 445, administer privilege 450, and list 455 of authorized users of user device 110/ display adapter 120. As described above, network server 135 may determine whether to register user device 110/display adapter 120 (e.g., for the video content service) based on credentials 420-430, privileges 440-450, and/or list 455 of authorized users. If network server 135 registers user device 110/display adapter 120, network server 135 may provide, to registration component 600 and application component 620, indication 340 that registration is complete.

Application component 620 may include hardware or a combination of hardware and software that may receive indication 340 that registration is complete, and may provide, to network server 135, request 350 to register applications (e.g., video applications, Internet browser applications, audio applications, etc.) of user device 110. Application component 620 may receive list 360 of registered display adapters of which the user of user device 110 is a valid user. In one example, list 360 of registered display adapters may include display adapter 120. Application component 620 may provide list 360 to content request component 630.

Content request component 630 may include hardware or a combination of hardware and software that may receive list 360 from application component 620, and may receive a user input 650 requesting video content from content provider 130. In one example, user input 650 may include the drag and drop action (e.g., associated with a display adapter provided in list 360) described above in connection with FIG. 3. Content request component 630 may generate request 370 for video content based on user input 650, and may provide request 370 to content provider 130. Content request component 630 may receive encoded video content 380 (e.g., requested by request 370) from content provider 130, and may provide encoded video content 380 to content decoder 640. In one example implementation, encoded video content 380 may include a media source or content URL 660 (e.g., providing a location of the requested video content) and access security data 670 associated with the requested video content. If content request component 630 initiates a session with content URL 660 and performs any needed security checks (e.g., associated with access security data 670), content provider 130 may stream the requested video content directly from content URL 660 to content request component 630. While display adapter 120 is displaying the requested video content, user device 110 may initiate an application that maintains a session with content URL 660 for the purpose of enabling a user to control (e.g., pause, stop, play, fast forward, rewind, etc.) the requested video content.

Content decoder 640 may include hardware or a combination of hardware and software that may receive encoded video content 380 from content request component 630, and may decode encoded video content 380. Content decoder 640 may cause the display (e.g., may provide audio and video) of the decoded video content, as indicated by reference number 390, to a user of user device 110/display adapter 120. In another implementation, if user device 110 (e.g., a television at home being viewed by children) displaying the decoded video content is separate from user device 110 utilizing display adaptor 120 (e.g., a smart phone used at work by a parent), content decoder 640 may cause the decoded video content to be displayed on the television at home.

Although FIG. 6 shows example functional components of display adapter 120, in other implementations, display adapter 120 may include fewer functional components, different functional components, differently arranged functional components, or additional functional components than depicted in FIG. 6. Alternatively, or additionally, one or more functional components of display adapter 120 may perform one or more other tasks described as being performed by one or more other functional components of display adapter 120.

FIGS. 7A-7D are diagrams of example user interfaces 700 capable of being generated by user devices 110, via display adapter 120. User interfaces 700 may include graphical user interfaces (GUIs) or non-graphical user interfaces, such as text-based interfaces. User interfaces 700 may provide information to users via customized interfaces (e.g., proprietary interfaces) and/or other types of interfaces (e.g., browser-based interfaces, etc.). User interfaces 700 may receive user inputs via one or more input devices, may be user-configurable (e.g., a user may change the size of user interfaces 700, information displayed in user interfaces 700, color schemes used by user interfaces 700, positions of text, images, icons, windows, etc., in user interfaces 700, etc.), and/or may not be user-configurable. Information associated with user interfaces 700 may be selected and/or manipulated by a user of user device 110 (e.g., via a touch screen display, control buttons, and/or a keypad).

As shown in FIG. 7A, user interface 700 may present various applications to a user, such as an electronic program guide (EPG) application 710. EPG application 710 may enable a user to peruse television programming or other video content provided by content provider 130. As further shown in FIG. 7A, user interface 700 may further include a representation 720 (e.g., a selection mechanism, such as a button, an icon, etc.) of a first display adapter 120 (e.g., associated with a smart phone displaying representation 720); and a representation 725 (e.g., a selection mechanism, such as a button, an icon, etc.) of a second display adaptor 120 (e.g., associated with a television). It may be assumed that the first and second display adapters 120 have been previously registered with network server 135 and/or network 140. The user may select one of the programs (e.g., a cars program 730) provided by EPG application 710 by touching a screen of user device 110.

As shown in FIG. 7B, the user may drag the selected program (e.g., cars program 730) to the first display adapter representation 720, as indicated by reference number 740, or may drag the selected program (e.g., cars program 730) to the second display adapter representation 725, as indicated by reference number 745. The user may drop the selected program (e.g., cars program 730) on the first display adapter representation 720 or the second display adapter representation 725. The drag and drop action may cause user device 110 (e.g., via display adapter 120) to generate request 370 and to check the requirements associated with the requested video content against the capabilities of display adapter 120. If display adapter 120 is capable of handling the requested video content, user device 110 may receive content URL 660 (e.g., providing a location of the requested video content) and access security data 670 associated with the requested video content. Display adapter 120 may initiate a session with content URL 660, may perform any needed security checks, and may initiate a transfer of the requested video content directly to the first or second display adapter 120.

Figure 7C:
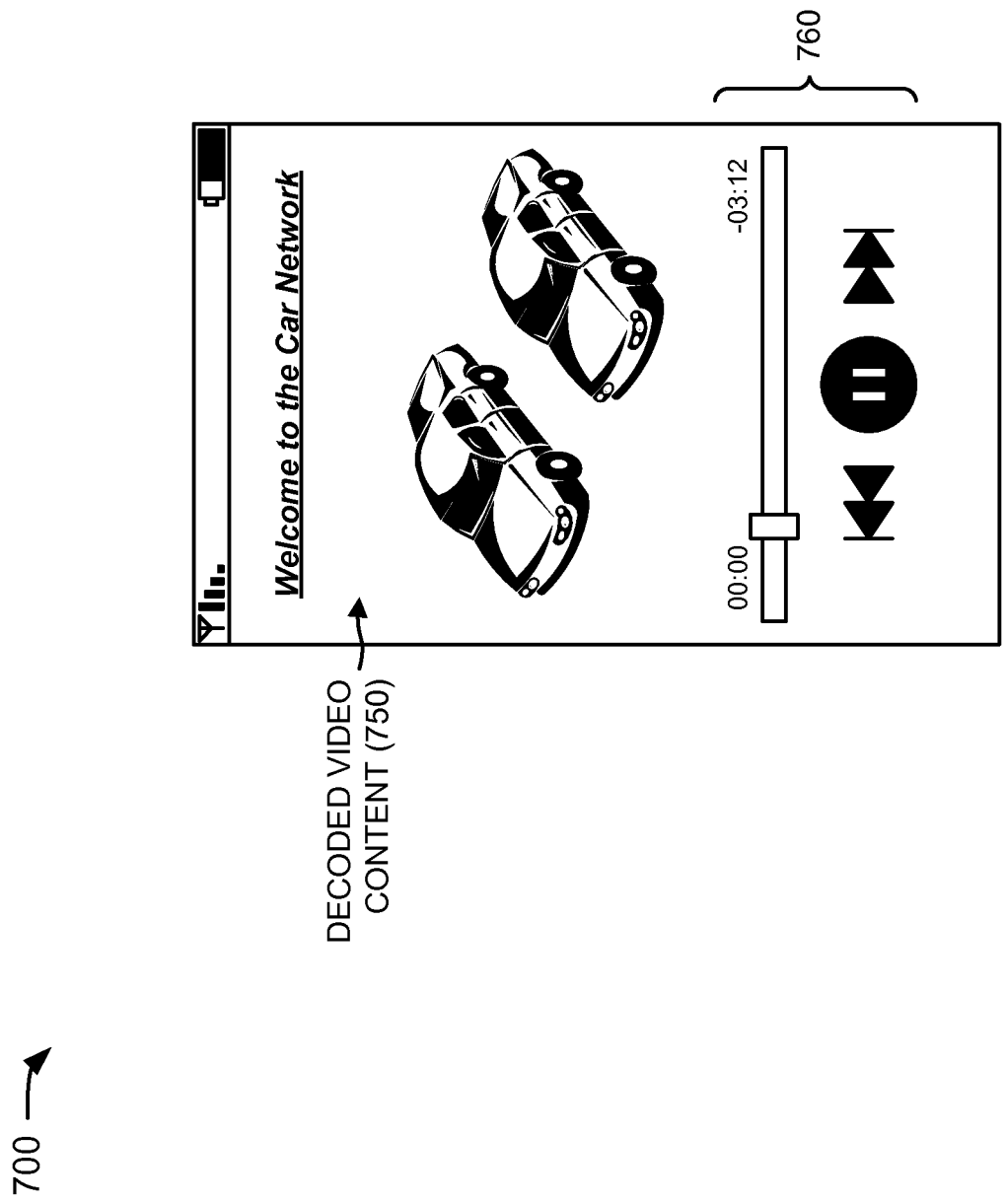

The requested video content may be streamed directly from content URL 660 to the first or second display adapter 120, may be decoded by the first or second display adapter 120, and may be displayed (e.g., as decoded video content 750) by user device 110, as shown in FIG. 7C (e.g., if the first display adapter representation 720 is selected). While the first display adapter 120 is displaying decoded video content 750, user device 110 may initiate an application that maintains a session with content URL 660 for the purpose of enabling a user to control (e.g., via control mechanisms 760, such as pause, stop, play, fast forward, rewind, etc.) decoded video content 750.

If the second display adapter representation 725 is selected by the user via the drag and drop action, the requested video content may be streamed directly from content URL 660 to the second display adapter 120 (e.g., television 110), may be decoded by the second display adapter 120, and may be displayed (e.g., as decoded video content 770) by television 110, as shown in FIG. 7D. While the second display adapter 120 is displaying decoded video content 770 on television 110, user device 110 (e.g., smartphone 110) may initiate an application that maintains a session with content URL 660 for the purpose of enabling a user to control (e.g., via control mechanisms 760, such as pause, stop, play, fast forward, rewind, etc.) decoded video content 770 displayed by television 110.

The foregoing scenarios were previously the exclusive domain of a video service STB and a display device (e.g., a television) attached to the STB. Implementations described herein may provide users with far more control over how they consume rich media content. Implementations described herein may also enable a user to utilize a variety of devices that execute applications and navigate a wide range of content from a wide range of sources. The user may then direct the content to any display adapter that is registered with network server 135 and/or network 140, is suitable for display of the content, and to which the user has use privileges.

Although user interfaces 700 of FIGS. 7A-7D depict a variety of information, in other implementations, user interfaces 700 may depict less information, different information, differently arranged information, or additional information than depicted in FIGS. 7A-7D.

FIGS. 8-10 are flow charts of an example process 800 for displaying encoded video content according to implementations described herein. In one implementation, process 800 may be performed by network server 135. In another implementation, some or all of process 800 may be performed by another device or group of devices (e.g., by another device provided in network 140, by content provider 130, etc.), including or excluding network server 135.

As illustrated in FIG. 8, process 800 may include receiving, from a user device, a request to subscribe to a video content service (block 810), and receiving privileges and authorized users associated with the user device (block 820). For example, in implementations described above in connection with FIG. 3, user device 110/display adapter 120 may subscribe to (or register with) a video content service provided by network server 135, as indicated by reference number 320. As part of the registration process with network server 135, user device 110/display adapter 120 may provide device credentials (e.g., an ATIS IIF compliant device certificate) to network server 135 and/or network 140. Part of the registration process with network server 135 may also include user device 110/display adapter 120 advertising (or providing) a list of authorized users (e.g., of user device 110/display adapter 120) and privileges associated with a user of user device 110/display adapter 120 to network server 135, as indicated by reference number 330.

As further shown in FIG. 8, process 800 may include registering the user device based on the request to subscribe, the privileges, and/or the authorized users (block 830), and receiving a request to register applications of the user device and registering the applications (block 840). For example, in implementations described above in connection with FIG. 3, network server 135 may determine whether to register user device 110/display adapter 120 (e.g., for the video content service) based on the provided credentials, the list of authorized users, and/or the provided privileges. In one example, if network server 135 registers user device 110/display adapter 120, network server 135 may provide, to user device 110/display adapter 120, indication 340 that registration is complete. User device 110 may provide a request to register applications (e.g., video applications, Internet browser applications, audio applications, etc.) of user device 110 to network server 135, as indicated by reference number 350. Network server 135 may receive request 350 and may register the applications of user device 110.

Returning to FIG. 8, process 800 may include providing a list of registered display adapters of the user device (block 850), receiving information for video content requested by the user device (block 860), and providing information about a registered display adaptor of the user device when the video content is approved (block 870). For example, in implementations described above in connection with FIG. 3, content provider 130 may receive request 370, and may check request 370 with network server 135, as indicated by reference number 375. If content provider 130 approves request 370, content provider 130 may request display information from network server 135, and network server 135 may provide display information to content provider 130, as further indicated by reference number 375. The display information may include information regarding the size of the display, the capabilities of the display (e.g., resolution capabilities, such as 1080i, 1080p, high definition, etc.), etc. associated with the selected display adapter 120. Based on the display information, content provider 130 may provide encoded video content 380 (e.g., requested by request 370) to display adapter 120.

Process block 810 may include the process blocks illustrated in FIG. 9. As shown in FIG. 9, process block 810 may include receiving a path to a web site that provides capabilities and attributes of the user device (block 900), receiving a security profile of the user device (block 910), and/or receiving a secure execution environment (SEE) level of the user device (block 920). For example, in implementations described above in connection with FIG. 4, registration component 400 of network server 135 may receive request 320 to subscribe to a video content service provided by network server 135. In one example, request 320 may include credentials 420-430 associated with user device 110/display adapter 120. Credentials 420-430 may include path 420 (e.g., a URL) to a web site where network server 135 may download capabilities and attributes (e.g., via an XML file) associated with user device 110/display adapter 120; content security profile 425 of user device 110/display adapter 120 (e.g., as verified by an independent test laboratory); and a SEE level 430 to which user device 110/display adapter 120 has been tested (e.g., as verified by an independent test laboratory).

Process block 820 may include the process blocks illustrated in FIG. 10. As shown in FIG. 10, process block 820 may include receiving permission to interrogate the user device (block 1000), receiving permission to send encoded video content to the user device (block 1010), and receiving permission to control a state of the user device (block 1020). For example, in implementations described above in connection with FIG. 4, privileges component 405 of network server 135 may receive information 330 from user device 110/display adapter 120. Information 330 may include privileges 440-450 associated with a user of user device 110/display adapter 120 and a list 455 of authorized users of user device 110/display adapter 120. Privileges 440-450 may include read privilege 440 (e.g., which may permit network server 135 to interrogate a state of user device 110/display adapter 120); write privilege 445 (e.g., which may permit network server 135 to approve content provider 130 for providing encoded video content to user device 110/display adapter 120); and/or administer privilege 450 (e.g., which may permit network server 135 to control a state of user device 110/display adapter 120). Privileges 440-450 may control what users can use display adapter 120, what devices can interrogate display adapter 120, and what devices have priority control over use of display adapter 120.

Figure 12:
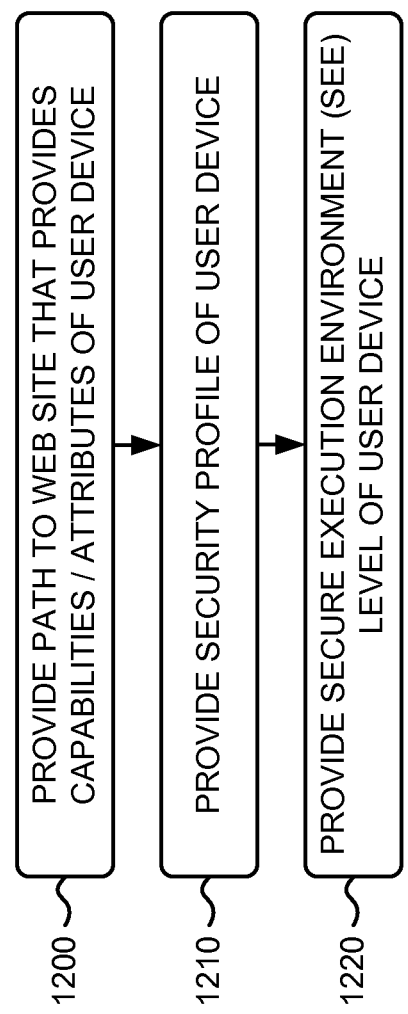
Figure 13:
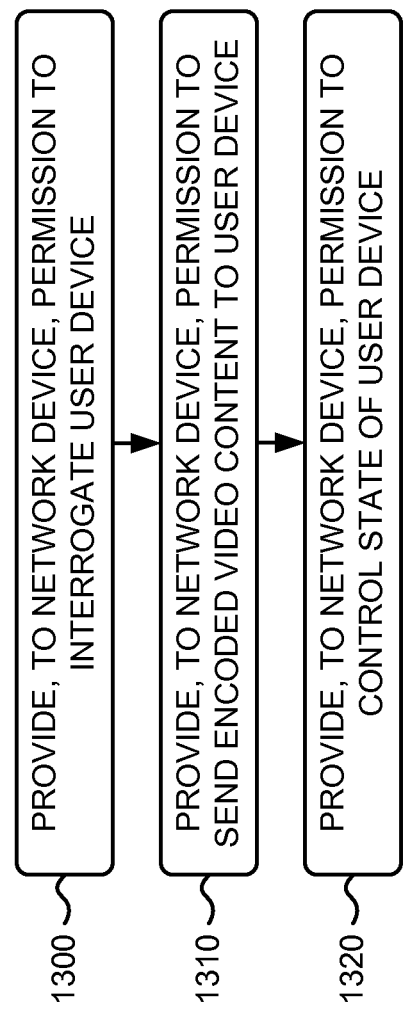

FIGS. 11-13 are flow charts of another example process 1100 for displaying encoded video content according to implementations described herein. In one implementation, process 1100 may be performed by user device 110 and/or display adapter 120. In another implementation, some or all of process 1100 may be performed by another device or group of devices, including or excluding user device 110.

As illustrated in FIG. 11, process 1100 may include registering with a network device associated with a network (block 1110), providing subscription information to the network device (block 1120), and providing, to the network device, privileges and authorized users (block 1130). For example, in implementations described above in connection with FIG. 3, user device 110 and/or display adapter 120 may register with network server 135 and/or network 140, as indicated by reference number 310. After registering with network server 135 and/or network 140, user device 110/display adapter 120 may subscribe to (or register with) a video content service provided by network server 135, as indicated by reference number 320. As part of the registration process with network server 135, user device 110/display adapter 120 may provide device credentials (e.g., an ATIS IIF compliant device certificate) to network server 135 and/or network 140. Part of the registration process with network server 135 may also include user device 110/display adapter 120 advertising (or providing) a list of authorized users (e.g., of user device 110/display adapter 120) and privileges associated with a user of user device 110/display adapter 120 to network server 135, as indicated by reference number 330.

As further shown in FIG. 11, process 1100 may include receiving, based on the subscription information and the privileges, an indication of registration with the network device (block 1140), providing a request to register applications to the network device (block 1150), and receiving a list of registered display adapter(s) (block 1160). For example, in implementations described above in connection with FIG. 3, network server 135 may determine whether to register user device 110/display adapter 120 (e.g., for the video content service) based on the provided credentials, the list of authorized users, and/or the provided privileges. In one example, if network server 135 registers user device 110/display adapter 120, network server 135 may provide, to user device 110/display adapter 120, indication 340 that registration is complete. User device 110 may provide a request to register applications (e.g., video applications, Internet browser applications, audio applications, etc.) of user device 110 to network server 135, as indicated by reference number 350. Network server 135 may receive request 350 and may register the applications of user device 110. User device 110 may retrieve (e.g., from network server 135) list 360 of registered display adapters of which the user of user device 110 is a valid user.

Returning to FIG. 11, process 1100 may include representing a registered display adapter(s) on a display (block 1170), providing a request for video content via a particular registered display adapter (block 1180), and receiving, decoding, and displaying, via the particular registered display adapter, encoded video content (block 1190). For example, in implementations described above in connection with FIG. 3, user device 110 may provide a representation (e.g., an icon, a button, or another selection mechanism) of each accessible display adapter (e.g., provided in list 360) on a display of user device 110. User device 110 (e.g., via display adapter 120) may provide request 370 for video content to content provider 130. Content provider 130 may receive request 370 and may provide encoded video content 380 (e.g., requested by request 370) to display adapter 120 (e.g., if approved by network server 135 via check 375). Display adapter 120 may receive encoded video content 380, may decode encoded video content 380, and may display (e.g., may provide audio and video) the decoded video content, as indicated by reference number 390.

Process block 1120 may include the process blocks depicted in FIG. 12. As shown in FIG. 12, process block 1120 may include providing a path to a web site that provides capabilities and attributes of the user device (block 1200), providing a security profile of the user device (block 1210), and/or providing a secure execution environment (SEE) level of the user device (block 1220). For example, in implementations described above in connection with FIG. 6, registration component 600 of user device 110/display adapter 120 may generate request 320 to subscribe to a video content service provided by network server 135. In one example, request 320 may include path 420 (e.g., a URL) to a web site where network server 135 may download capabilities and attributes (e.g., via an XML file) associated with user device 110/display adapter 120; content security profile 425 of user device 110/display adapter 120 (e.g., as verified by an independent test laboratory); and SEE level 430 to which user device 110/display adapter 120 has been tested (e.g., as verified by an independent test laboratory).

Process block 1130 may include the process blocks illustrated in FIG. 13. As shown in FIG. 13, process block 1130 may include providing, to the network device, permission to interrogate the user device (block 1300), providing, to the network device, permission to send encoded video content to the user device (block 1310), and providing, to the network device, permission to control a state of the user device (block 1320). For example, in implementations described above in connection with FIG. 6, privileges component 610 of user device 110/display adapter 120 may provide information 330 to network server 135. Information 330 may include read privilege 440 (e.g., which may permit network server 135 to interrogate a state of user device 110/display adapter 120); write privilege 445 (e.g., which may permit network server 135 to approve content provider 130 for sending encoded video content to user device 110/display adapter 120); administer privilege 450 (e.g., which may permit network server 135 to control a state of user device 110/display adapter 120); and list 455 of authorized users of user device 110/display adapter 120.

Systems and/or methods described herein may enable a television service provider to provide encoded video content (e.g., television programming) to any suitable user device (e.g., other than a STB) display and/or may enable the user device to display such video content on displays other than the user device display. For example, the systems and/or methods may enable encoded video content (e.g., television programming previously only available via STBs) to be displayed on personal computers, smartphones, tablet computers, laptop computers, gaming systems, and/or any other user device display. The systems and/or methods may utilize a network (e.g., interconnecting user devices and television service providers) as an interconnected control and bearer plane between application platforms (e.g., provided by the television service providers) and user device displays. The decoupling of the application platform and the display platform (e.g., the STB) may afford customers with a great deal of flexibility in viewing television content, while adding value for the television service provider.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 8-13, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as a "component" or "logic" that performs one or more functions. These components or logic may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computing device-implemented method, comprising:
   receiving, by a computing device and from a user device, a request to subscribe to a video content service;
   receiving, by the computing device, privileges and a list of authorized users associated with the user device;
   registering, by the computing device, the user device based on the request to subscribe and based on the privileges and list of authorized users associated with the user device; and
   providing, by the computing device and to the user device a list of one or more registered display adapters that include the user device and are configured to receive encoded video content from a content provider over a network and to display the encoded video content,
   wherein the user device is configured to:
      display, on a graphical user interface of the user device, the list of the one or more registered display adapters;
      receive, via the graphical user interface, user input that identifies a registered display adapter among the list of the one or more registered display adapters; and
      select, based on the user input, the identified registered display adapter,
   wherein at least one of the registered display adapters is hosted on a device different from the computing device and the user device, and
   wherein each of the registered display adapters and the user device does not include the computing device.

2. The computing device-implemented method of claim 1, further comprising:
   receiving information associated with video content requested by the user device; and providing information, to the content provider, about the selected registered display adapter when the requested video content is approved by the content provider,
   where the selected registered display adapter decodes the requested video content and provides the decoded video content for display.

3. The computing device-implemented method of claim 1, where the encoded video content includes one or more of video content, audio content, or associated metadata.

4. The computing device-implemented method of claim 1, where the user device comprises one of:
   a radiotelephone,
   a personal communications system (PCS) terminal,
   a personal digital assistant (PDA),
   a smartphone,
   a laptop computer,
   a global positioning system (GPS) device,
   a personal computer,
   a tablet computer, or
   a gaming system.

5. The computing device-implemented method of claim 1, where the request to subscribe includes one or more of:
   a path to a web site that provides capabilities and attributes associated with the user device,
   a security profile of the user device, or a secure execution environment (SEE) level of the user device.

6. The computing device-implemented method of claim 1, where the privileges include one or more of:
   permission to interrogate the user device,
   permission to send encoded video content to the user device, or
   permission to control a state of the user device.

7. A method implemented by a user device, the method comprising:
   registering the user device with a network device associated with a network;
   providing, by the user device, subscription information to the network device;
   receiving, by the user device and based on the subscription information, an indication of registration with the network device;
   receiving, by the user device from the network device and based on the indication of registration, a list of one or more of registered display adapters that include the user device and are configured to receive encoded video content from a content provider device over the network and to display the encoded video content;
   displaying, on a graphical user interface of the user device, the list of one or more of the registered display adapters;
   receiving, via the graphical user interface, user input that identifies a registered display adapter from the list of one or more of the registered display adapters; and
   selecting, based on the user input, the identified registered display adapter,
   wherein at least one of the registered display adapters is hosted on a device different from the network device and the user device, and
   wherein each of the registered display adapters and the user device does not include the network device.

8. The method of claim 7, further comprising:
   providing, to the content provider device, a request for video content via the user device;
   receiving, from the content provider device and based on the request for video content, the encoded video content via the selected registered display adapter;
   decoding the encoded video content via the selected registered display adapter; and
   displaying the decoded video content on a display of the user device.

9. The method of claim 8, where providing a request for video content comprises:
   receiving, from a user of the user device, a selection of a video program;
   receiving, from the user, a selection of the identified registered display adapter; and providing, to the content provider device, a request for the selected video program based on the selected registered display adapter.

10. The method of claim 7, where the subscription information includes one or more of:
    a path to a web site that provides capabilities and attributes associated with the user device,
    a security profile of the user device,
    a secure execution environment (SEE) level of the user device,
    an identifier of the user device, or
    a network address of the user device.

11. The method of claim 7, where the subscription information includes one or more of:
    permission to interrogate the user device,
    permission to send encoded video content to the user device, or
    permission to control a state of the user device.

12. A computing device, comprising:
    a memory to store a plurality of instructions; and
    a processor to execute instructions in the memory to:
       receive, from a user device, a request to subscribe to a video content service,
       receive privileges associated with the user device,
       register the user device based on the request to subscribe and based on the privileges associated with the user device, and
       provide, to the user device and based on the request to register, a list of first one or more registered display adapters in a second one or more registered display adapters that include the user device and are configured to receive encoded video content from a content provider over a network and to display the encoded video content,
    wherein the user device is configured to:
       display, on a graphical user interface of the user device, the list of the first one of more registered display adapters;
       receive, via the graphical user interface, user input that identifies a registered display adapter among the list of the first one or more registered display adapters; and
       select, based on the user input, the identified registered display adapter,
    wherein at least one of the registered display adapters is hosted on a device different from the computing device and the user device, and
    wherein each of the registered display adapters and the user device does not include the computing device.

13. The computing device of claim 12, where the processor is further to execute instructions in the memory to:
    receive information associated with video content requested by the user device, and
    provide information, to the content provider, about the selected registered display adapter when the requested video content is approved by the content provider,
    where the selected registered display adapter decodes the requested video content and provides the decoded video content for display.

14. The computing device of claim 12, where the encoded video content includes one or more video content, audio content, or associated metadata.

15. The computing device of claim 12, where the selected registered display adapter includes an application executing on the user device.

16. The computing device of claim 12, where the request to subscribe includes one or more of:
    a path to a web site that provides capabilities and attributes associated with the user device,
    a security profile of the user device, or
    a secure execution environment (SEE) level of the user device.

17. The computing device of claim 12, where the privileges include one or more of:
    permission to interrogate the user device,
    permission to send encoded video content to the user device, or
    permission to control a state of the user device.

18. A user device comprising:
    a memory to store a plurality of instructions; and
    a processor to execute instructions in the memory to:
       register the user device with a network device associated with a network,
       provide subscription information to the network device, receive, based on the subscription information, an indication of registration with the network device, receive, based on the indication of registration, a list of one or more of registered display adapters that include the user device;

display, on a graphical user interface of the user device, the list of one of more of the registered display adapters configured to receive encoded video content from a content provider device over the network and to display the encoded video content;

receive, via the graphical user interface, user input that identifies a registered display adapter among the list of one or more of the registered display adapters;

select, based on the user input, the identified registered display adapter;

provide a representation of the selected registered display adapter on a display of the user device, provide, to the content provider device, a request for the encoded video content via the representation of the selected registered display adapter, wherein at least one of the registered display adapters is hosted on a device different from the user device and the network device, and wherein each of the registered display adapters and the user device does not include the network device.

19. The user device of claim 18, where the subscription information includes one or more of:

a path to a web site that provides capabilities and attributes associated with the user device, a security profile of the user device, a secure execution environment (SEE) level of the user device, an identifier of the user device, or a network address of the user device.

20. The user device of claim 18, where the subscription information includes one or more of:

permission to interrogate the user device, permission to send encoded video content to the user device, or permission to control a state of the user device.

21. The user device of claim 18, where the selected registered display adapter includes an application executing on the user device.

* * * * *